US006415978B1

(12) United States Patent
McAllister

(10) Patent No.: US 6,415,978 B1
(45) Date of Patent: Jul. 9, 2002

(54) MULTIPLE TECHNOLOGY DATA READER FOR BAR CODE LABELS AND RFID TAGS

(75) Inventor: Clarke W. McAllister, Eugene, OR (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/304,228

(22) Filed: May 3, 1999

(51) Int. Cl.⁷ ................................................. G06K 7/10
(52) U.S. Cl. .............................. 235/462.01; 235/462.13
(58) Field of Search ....................... 235/462.13, 462.01, 235/462.14, 462.25

(56) References Cited

U.S. PATENT DOCUMENTS

| | | | | |
|---|---|---|---|---|
| 3,826,900 A | * | 7/1974 | Moellering | 235/61.11 E |
| 4,318,090 A | | 3/1982 | Narlow et al. | 340/572 |
| 4,387,297 A | | 6/1983 | Swartz et al. | 235/462 |
| 5,029,183 A | | 7/1991 | Tymes | 375/1 |
| 5,059,951 A | * | 10/1991 | Kaltner | 340/572 |
| 5,170,045 A | * | 12/1992 | Bengtsson | 235/462 |
| 5,216,233 A | * | 6/1993 | Main et al. | 235/472 |
| 5,315,096 A | * | 5/1994 | Muller et al. | 235/462 |
| 5,382,784 A | | 1/1995 | Eberhardt | 235/472 |
| 5,640,002 A | * | 6/1997 | Ruppert et al. | 235/472 |
| 5,825,045 A | * | 10/1998 | Koenck et al. | 235/380 |
| 5,979,758 A | * | 11/1999 | Swartz et al. | 235/383 |
| 6,056,199 A | * | 5/2000 | Wiklof et al. | 235/462.45 |
| 6,078,251 A | * | 6/2000 | Landt et al. | 340/10.41 |
| 6,150,942 A | * | 11/2000 | O'Brien | 340/573.1 |
| 6,195,053 B1 | * | 2/2001 | Kodukula et al. | 235/462.47 |

\* cited by examiner

*Primary Examiner*—Thien M. Le
*Assistant Examiner*—Daniel St. Cyr
(74) *Attorney, Agent, or Firm*—Lyon & Lyon LLP

(57) ABSTRACT

A multiple technology data reader, for reading bar code labels and RFID tags. The multiple technology data reader includes a bar code reader and a radio frequency identification (RFID) reader, connected to a host computer via a computer bus, such as a universal serial bus (USB). The bar code reader and the RFID reader communicate with the host computer through logically independent data pipes and device drivers. Compound, composite, or complex interface implementations are possible. A single electronic interface may be configured to allow a single host computer to logically communicate with the bar code and RFID readers as either separate independent readers, or as a single cooperative multiformat label/tag data reader. Thus, the bar code and RFID readers may be operated independently, or powered and operated simultaneously.

43 Claims, 8 Drawing Sheets

MULTIPLE TECHNOLOGY DATA READER FOR BAR CODE LABELS AND RFID TAGS

BACKGROUND OF THE INVENTION

The field of the present invention generally relates to optical systems for data reading and radio frequency identification (RFID) systems for remote identification of physical objects. More particularly, the field of the present invention relates to a multiple technology data reader for reading bar code labels and RFID tags.

Optical reading systems are widely used to read data, in the form of bar codes or other encoded symbols, printed on various objects. These systems may be used for a wide variety of applications, such as inventory control and point-of-sale transactions in retail stores.

Optical reading systems may employ an optical reader that illuminates a bar code (for example) and detects light reflected from the bars and spaces of the code. In one type of optical reading system, an optical beam of light produced by a laser diode is used to scan the bar code symbol. The bars of the code absorb light, while the spaces of the code reflect light. The resulting pattern of reflected light is detected by circuitry within the optical reader. The reflected light can be detected by a photocell, photodiode, CCD array, or CMOS array sensor.

After the bar code data is received by the optical reader, the detected signal may be subject to filtering, amplification, digitization and decoding. The detected signal may be transmitted to a processor or decoder located within the optical reader, or to a separate device such as a personal computer. In systems where the signal is conveyed to a separate device, the optical reader may be connected to the external data processor by means of cables or via a wireless communication link. The wireless communication link can be implemented using radio frequency (RF) equipment or infrared (IR) transmitters and receivers, for example.

In retail stores, optical reading systems may be set up at check-out stands and may be built into a horizontal check-out counter, so that items to be purchased can be placed on a counter, deck or conveyor, and then moved through an optical reading area. Alternatively, the optical reader may be a handheld device, in the shape of a wand or gun. Typically, in operation these handheld devices are pointed or aimed at the retail item, so that a wide range of information, including price, may be read from the object.

RFID systems can be used to identify retail items by reading electronic information stored within tags or labels on the items. These systems can be used to remotely identify physical objects by the response signal sent back by the tag.

An RFID system typically employs at least two components, a "transponder" or "tag," which is attached to the physical item to be identified, and a "reader," which sends an electromagnetic signal the transponder and then detects a response. Typically, the reader emits a RF signal which is received by the transponder, after the transponder comes within an appropriate range. In response to the signal from the reader, the transponder sends a modulated RF signal sent back to the reader. The reader detects this modulated signal, and can identify the transponder by decoding the modulated signal. After identifying the transponder, the reader can either store the decoded information or transmit the decoded signal to a computer.

The transponder used in an RFID system may be either "passive" or "active." A passive transponder can be a simple resonant circuit, including an inductive coil and a capacitor. Passive transponders are generally powered by the carrier signal transmitted from the reader. Active transponders, on the other hand, generally include transistors or other active circuitry, and require their own battery source.

In some retail environments, both bar code labels and RFID tags are attached to various retail items. In these environments an optical reader is needed to read the bar code label, and a separate RFID reader is needed to detect and identify the RFID tag. Without a dual-technology device embodying both bar code and RFID reading functionality, two separate devices would be needed to read both bar codes and RFID tags. Thus, there is a present need for a dual-technology bar code/RFID reader.

One example of a hand-held dual technology identification tag reading head, that can read both bar codes and RFID tags is described in U.S. Pat. No. 5,382,784, issued to Eberhardt. However, the present inventor has recognized that the system described in that patent has several drawbacks. For example, in that system, in order to operate the hand-held reader, a user must selectively actuate either the bar code reader or RFID tag reader. Moreover, at any given time, only one of readers is powered. Therefore, simultaneous operation of both the bar code reader and the RFID tag reader is not possible. In addition, when the RFID reader is selected, the output signal from the RFID reader must be converted to a format corresponding to the output signal from the bar code reader, in order to be fed into a single input port of a data receiver.

Thus, the present inventor has determined it would be advantageous to provide a dual-technology bar code/RFID reader which is capable of reading bar codes and RFID tags simultaneously, and which is more versatile than the previously described devices.

SUMMARY OF THE INVENTION

The present invention relates to a multiple technology data reader for reading optical code labels and RFID tags. In one embodiment, the multiple technology data reader includes an optical code reader sub-system and an RFID reader sub-system, each electronically connected to a device microcontroller. The device microcontroller includes a device interface for the bar code reader subsystem, and a device interface for the RFID reader subsystem. Both of these device interfaces are connected to a device communications, control and power unit. The device microcontroller is connected to a host computer via a computer bus, such as a universal serial bus (USB).

In another embodiment, the multiple technology data reader includes an optical code reader and an RFID reader, each electronically connected to a device microcontroller. The device microcontroller includes a first decoder and control means for the bar code reader, and a second decoder and control means for the RFID reader. Both of these decoder and control means are connected to a device communications, control and power unit. The device microcontroller is connected to a host computer via a computer bus, such as a USB.

In another embodiment, the multiple technology data reader includes a bar code reader and an RFID reader, each connected to a device microcontroller. The device microcontroller includes a bar code pre-processor and an RFID pre-processor, each of which are connected to a single decoding and control means. The decoding and control means is connected to a device communications, control and power unit. The device microcontroller is connected to a host computer via a USB.

Further variations, modifications and alternative embodiments are also described herein.

DETAILED DESCRIPTION OF THE PREFERRED EMBODIMENTS

Preferred embodiments will now be described with reference to the drawings.

Figure 1:
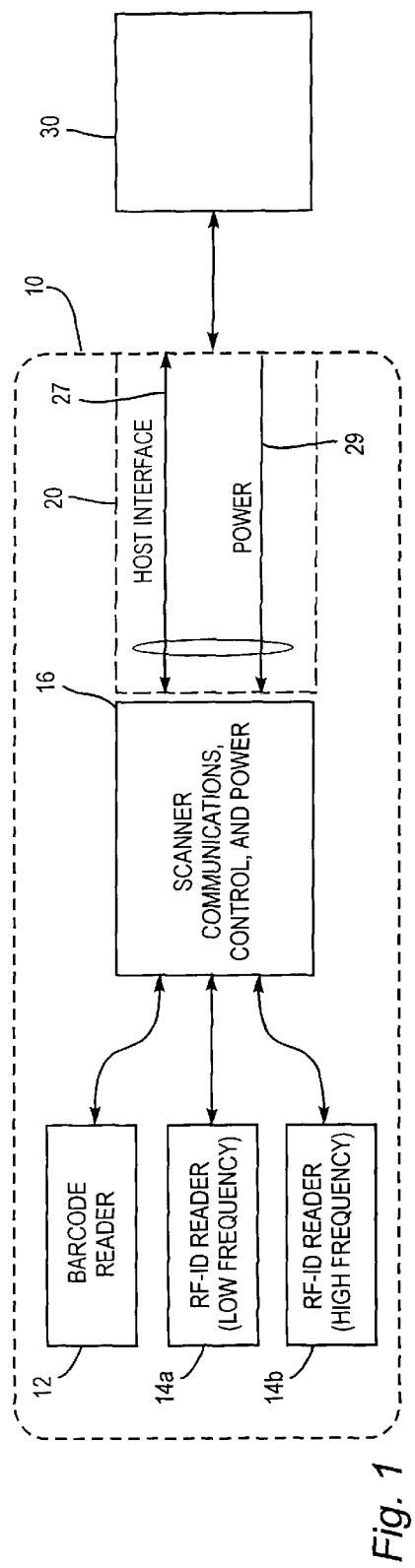
FIG. 1 is a system block diagram of a multiple technology data reader, according to an embodiment of the present invention.

FIG. 1 is a system block diagram of a preferred embodiment of a multiple technology data reader 10. The multiple technology data reader 10 shown in FIG. 1 includes an optical code reader, such as a bar code reader 12, a low frequency RFID reader 14a, and/or a high frequency RFID reader 14b. The bar code reader 12, a low frequency RFID reader 14a, and/or a high frequency RFID reader 14b are each connected to a device communications, control and power unit 16. While it is convenient to combine communications, control and power functionality within the device communications, control and power unit 16, such functionality can also be separated into different units, either in the FIG. 1 embodiment or the other embodiments described later herein.

The device communications, control and power unit 16 is preferably connected to a host device 30 over a USB 20, which comprises a serial communications signal line 27 and a set of power signal lines 29. The USB 20 supplies power from the host computer 30, and establishes a two-way communication link between the multiple technology data reader 10 and the host computer 30. As an alternative to the host computer 30 supplying power via the USB 20, or in addition thereto, an independent power source (not shown) may be included within the multiple technology data reader 10, either in the FIG. 1 embodiment or the other embodiments described later herein.

In operation, the device communications, control and power unit 16 receives data signals from the bar code reader 12 and the RFID readers 14a and 14b, and provides power to each of these readers. The device communications, control and power unit 16 may also be used to activate the bar code reader 12 and the RFID readers 14a and 14b independently, simultaneously or concurrently.

Figure 2:
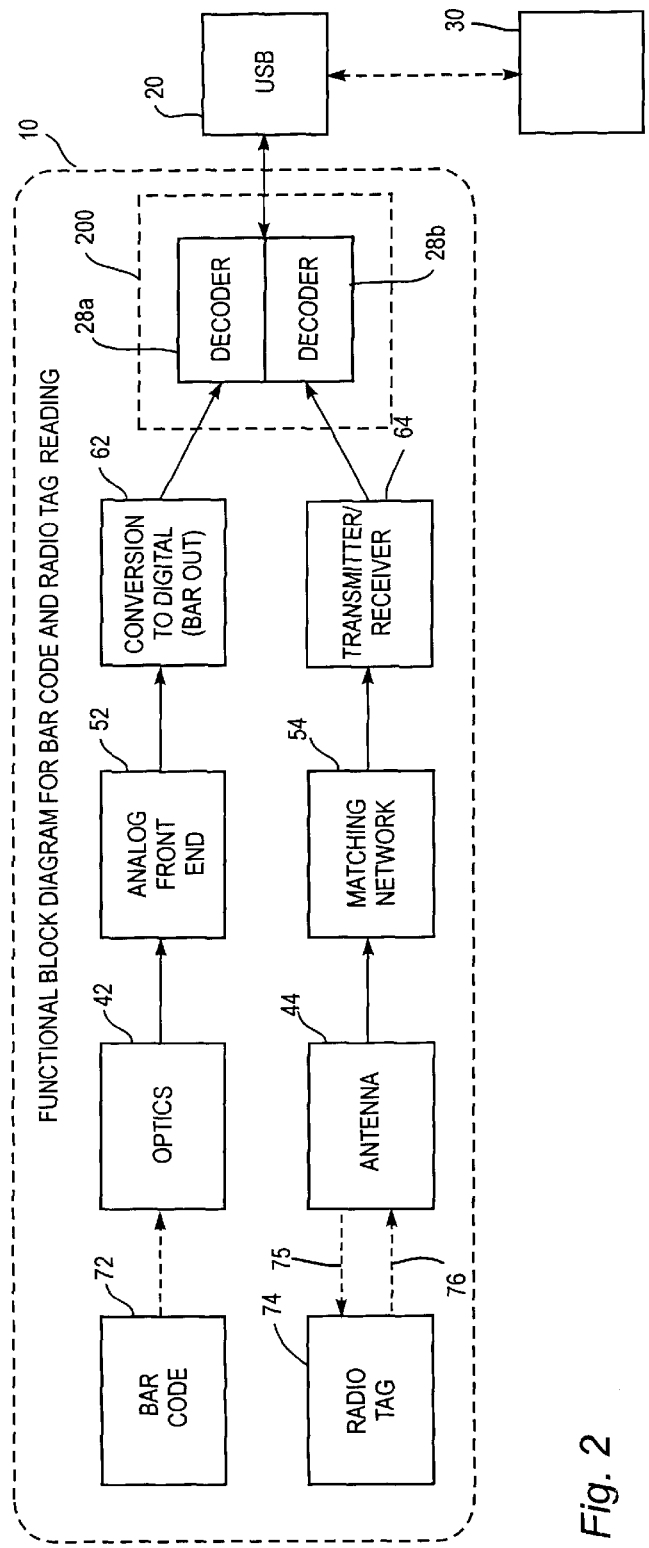
FIG. 2 is a functional block diagram of a multiple technology data reader, according to an embodiment of the present invention.

FIG. 2 is a functional block diagram of a multiple technology data reader 10, which can read a bar code 72 or an RFID tag 74. The bar code 72 is read and detected by an optics means 42, which sends the detected signal to an analog front end means 52. The analog signal is then converted to a digital signal by a conversion to digital means 62. The converted digital signal is decoded by a bar code decoder 28a, and then sent to a host computer 30 via a USB 20.

The RFID tag 74 is detected by an antenna 44. The antenna transmits an electromagnetic signal 75 and detects a response signal 76 from the RFID tag 74. The response signal 76 is sent to an RFID transmitter/receiver 64 through an impedance matching network 54, which matches the impedance of the antenna 44 with the impedance of the RFID transmitter/receiver 64. The response signal 76 is then decoded by an RFID decoder 28b, and then sent to a host computer 30 via the USB 20.

Figure 3:
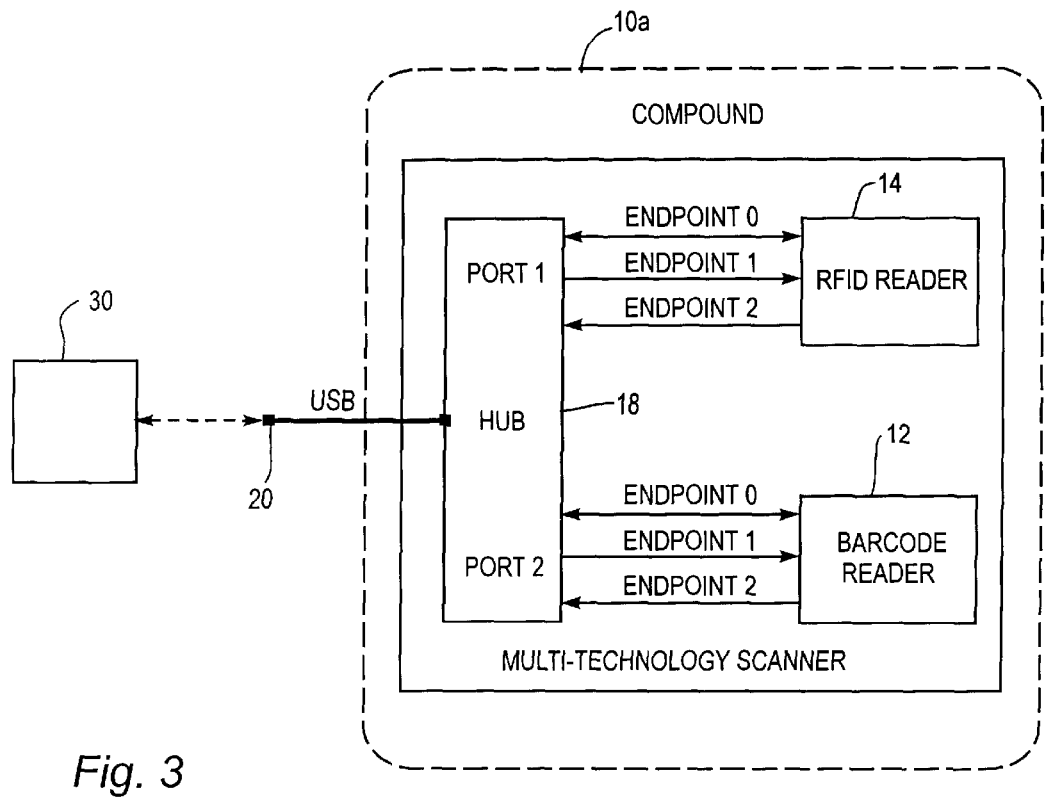
FIG. 3 is a block diagram illustrating the logical connections for a compound multiple technology data reader according to an embodiment of the present invention.

FIG. 3 is a block diagram illustrating a preferred configuration of logical connections for a multiple technology data reader 10a according to one embodiment utilizing a compound interface between the data reading components and the host device. In FIG. 3, a multiple technology data reader 10a includes an RFID reader 14, connected to one port of an internal hub 18, and a bar code reader 12, connected to another port of hub 18. The internal hub 18 is connected to a USB 20, which supplies power from a host computer 30 and establishes a two-way communication link between the compound multiple technology data reader 10a and the host computer. The RFID reader 14 and bar code reader 12 are logically addressable over the USB 20 via the internal hub 18. The multiple technology scanner 10a shown in FIG. 3 operates in a manner as described with regard to FIG. 1.

Figure 4:
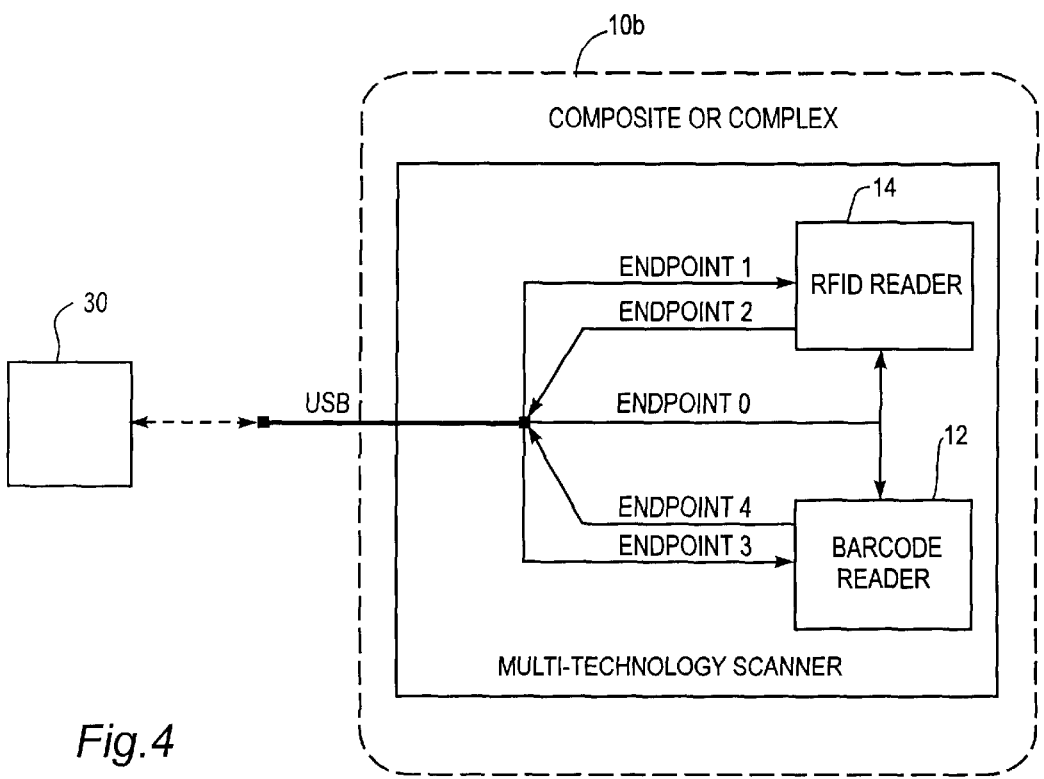
FIG. 4 is a block diagram illustrating the logical connections for a composite or complex multiple technology data reader according to another embodiment of the present invention.

FIG. 4 is a block diagram illustrating a preferred configuration of logical connections for a multiple technology data reader 10b according to another embodiment utilizing a composite or complex interface between the data reading components and the host device. In the FIG. 4 embodiment, the multiple technology data reader 10b includes an RFID reader 14, and a bar code reader 12, both connected to a USB 20. The RFID reader 14 and bar code reader 12 are logically addressed without the use of an internal hub (such as used in the embodiment shown in FIG. 3). In the FIG. 4 embodiment, the USB 20 supplies power from a host computer 30 and establishes a two-way communication link between the composite multiple technology data reader 10b and the host computer.

In a variation of the FIG. 4 embodiment, the multiple technology data reader 10b uses a complex interface implementation that is based on human interface device (HID) report descriptors, and is specific to HID class USB devices (i.e. a keyboard, mouse, etc.). In all other respects, this variation operates in the same manner as the FIG. 4 embodiment as described above.

Figure 5:
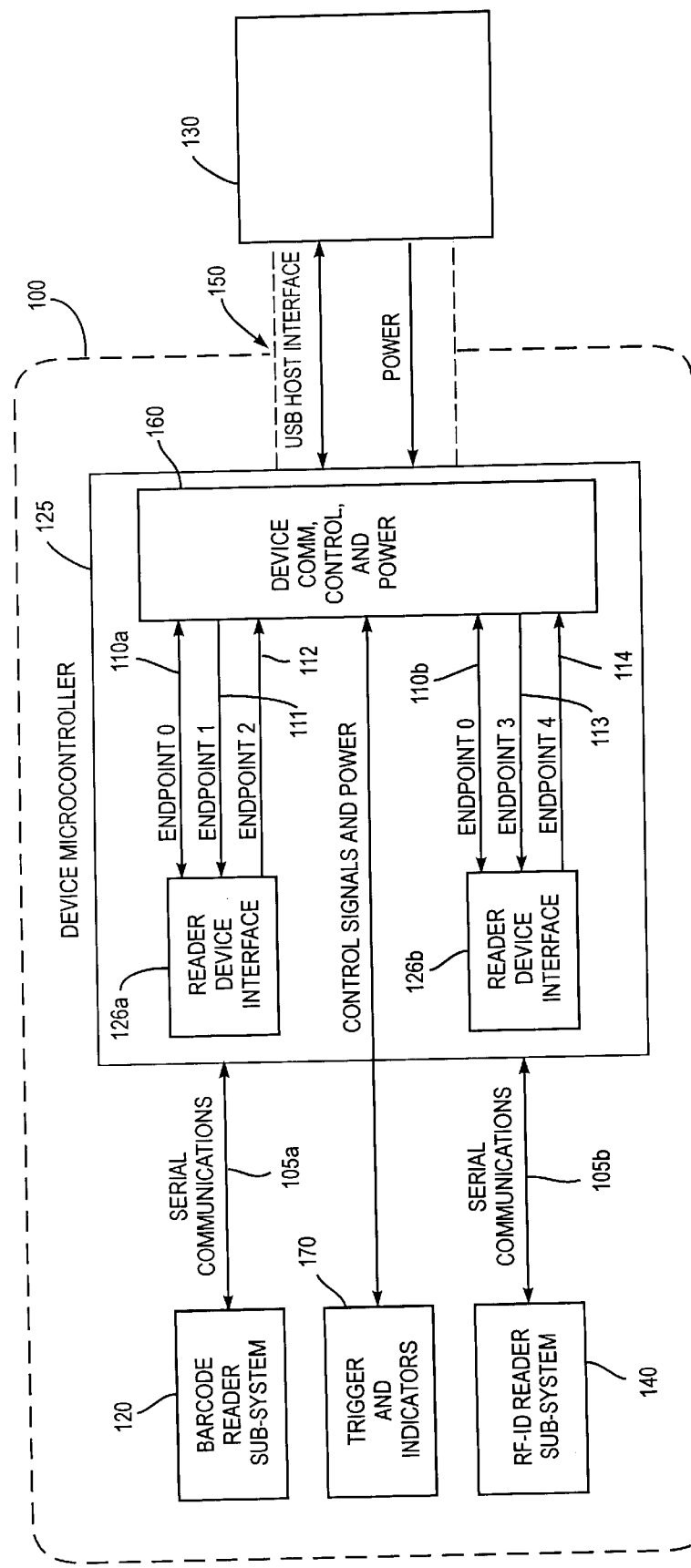
FIGS. 5–10 illustrate six alternate circuit diagrams for different embodiments of the multiple technology data reader as described herein.

FIGS. 5–10 illustrate six alternative system architectures in accordance with a multiple technology data reader 10 such as shown in FIG. 1 and described herein. In a first embodiment, as shown in FIG. 5, the multiple technology data reader 100 includes a bar code reader subsystem 120, and an RFID reader sub-system 140, each serially connected to a device microcontroller 125. The device microcontroller 125 includes a device interface 126a for the bar code reader subsystem, and a device interface 126b for the RFID reader subsystem, each of which is connected to a device communications, control and power unit 160. The multiple technology data reader 100 also includes a trigger unit 170, which sends and receives control signals and power, both to and from the device communications, control and power unit 160 on the device microcontroller 125. The device microcontroller 125 is connected to a host computer 130 via USB 150.

In the embodiment shown in FIG. 5, the reader device interfaces 126a has an input/output endpoint zero 110a, which enables the host computer 130 to use a default control method to initialize and configure the reader device interface 126a. In addition, the reader device interface 126a has an endpoint one 111, which allows the host computer 130 to send data to the reader device interface 126a, and an endpoint 112, which allows the reader device interface 126a to send data to the host computer 130. Furthermore, data can be sent in either direction between the reader device interface 126a and the barcode reader subsystem 120 via a serial communication line 105a.

In a similar manner, reader device interface 126b has an input/output endpoint zero 110b, which enables the host computer to use a default control method to initialize and configure the reader device interface 126b. In addition, endpoint three 113 and endpoint four 114, respectively allow the host computer to send data to the reader device interface 126b, and the reader device interface 126b to send data to the host computer. Data can be sent in either direction between the reader device interface 126b and the RFID reader subsystem 140 via the serial communication line 105b.

This first embodiment is an example of how the multiple technology data reader 300 may be readily implemented using off-the-shelf components.

Figure 6:
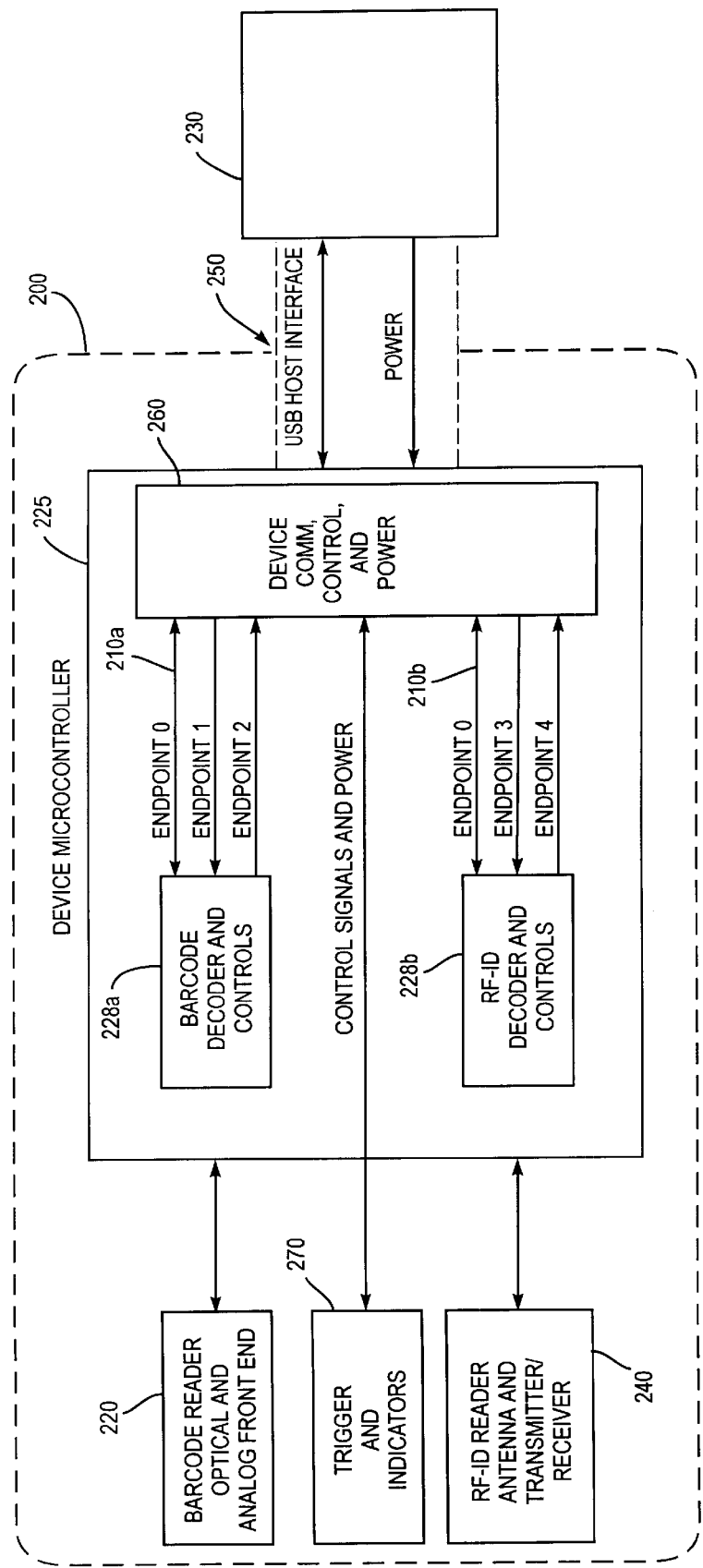

In a second embodiment, as shown in FIG. 6, the multiple technology data reader 200 includes the optical and analog front end components of a bar code reader 220, and the antenna and transmitter/receiver components of an RFID reader 240, which are connected to a device microcontroller 225. The device microcontroller 225 includes a decoder and control unit 228a for the bar code reader, and another decoder and control unit 228b for the RFID reader. The decoder and control units 228a and 228b are each connected to a device communications, control and power unit 260. The multiple technology data reader 200 also includes a trigger unit 270, which sends and receives control signals and power, both to and from the device communications, control and power unit 260 on the device microcontroller 225. The device microcontroller 225 is connected to a host computer 230 via USB 250.

In the embodiment shown in FIG. 6, the bar code decoder and control unit 228a has the same endpoints as the reader device interface 126a described in FIG. 5. Likewise, the RFID decoder and control unit 228b has the same endpoints as the reader device interface 126b described in FIG. 5.

Figure 7:
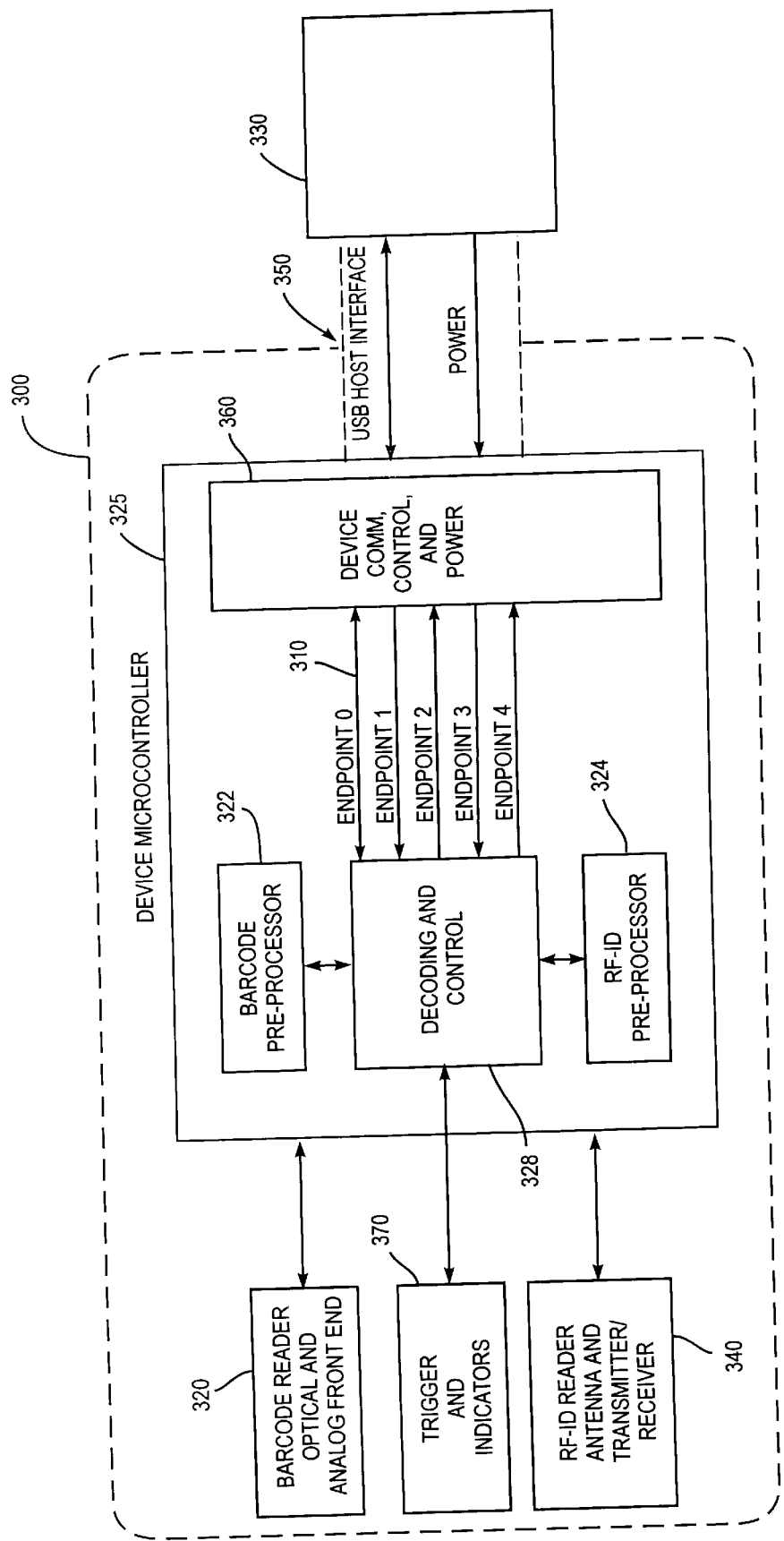

In a third embodiment, as shown in FIG. 7, the multiple technology data reader 300 includes the optical and analog front end components of a bar code reader 320, and the antenna and transmitter/receiver of an RFID reader 340, which are connected to a device microcontroller 325. The device microcontroller 325 includes a bar code pre-processor 322 and an RFID pre-processor 324, both of which are connected to a common decoding and control unit 328. The decoding and control unit 328 is connected to a device communications, control and power unit 360. The multiple technology data reader 300 also includes a trigger unit 370, which sends and receives control signals and power, both to and from the device communications, control and power unit 360 on the device microcontroller 325. The device microcontroller 325 is connected to a host computer 330 via USB 350.

In the embodiment shown in FIG. 7, the decoding and control unit 328 has an input/output endpoint zero 310, which enables the host computer to use a default control method to initialize and configure the decoding and control unit 328. In addition the decoding and control unit 328 has four additional endpoints, which enable data to be sent to and from the host computer 330.

By integrating the bar code pre-processor 322, the RFID pre-processor 324, and the decoding and control unit 328 into the device microcontroller 325, the manufacturing costs for the multiple technology data reader 300 may be reduced. Moreover, integration of these components enables optimal performance from the multiple technology data reader 300.

Figure 8:
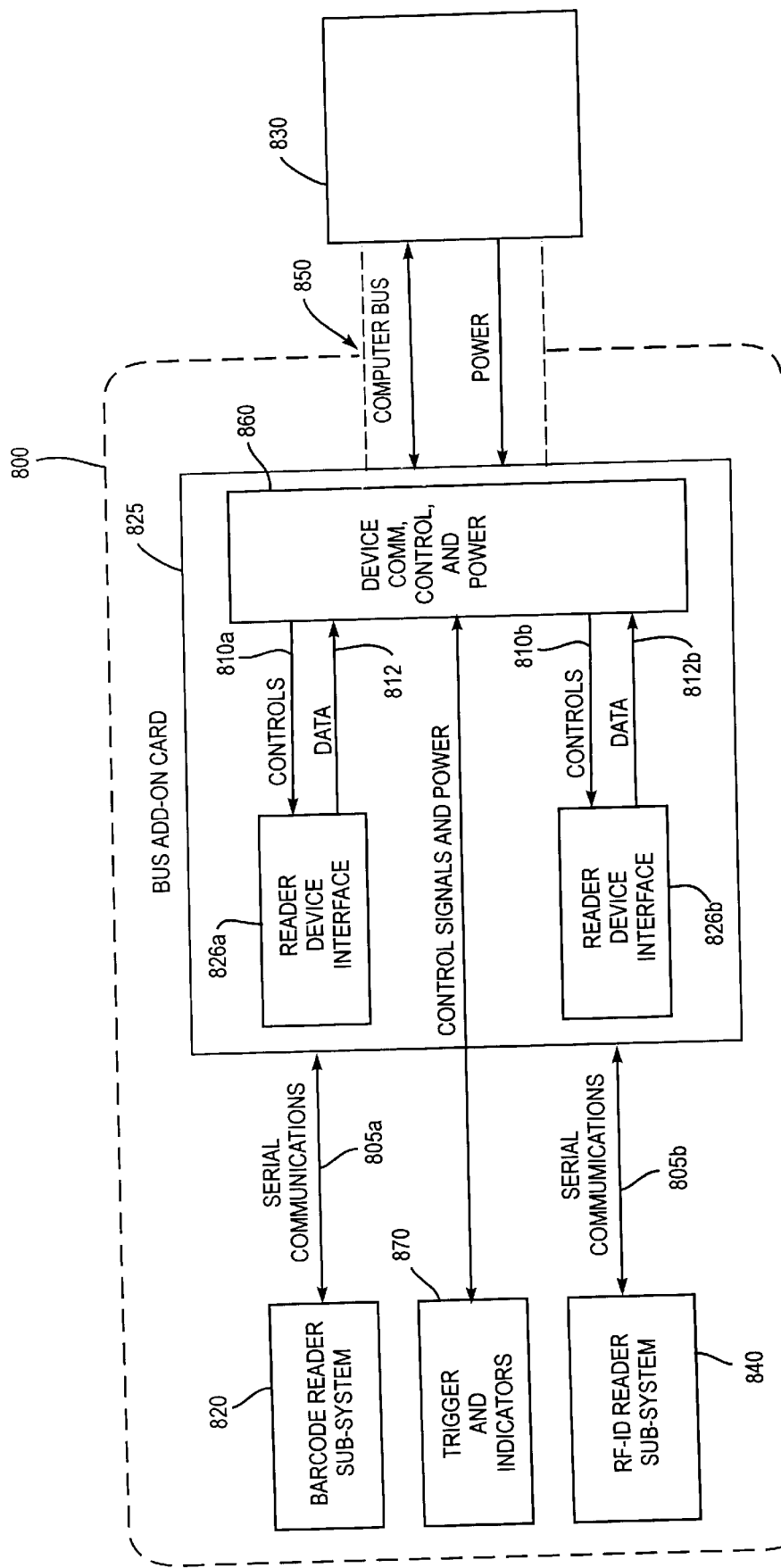

In a fourth embodiment, as shown in FIG. 8, the multiple technology data reader 800 includes a bar code reader sub-system 820, and an RFID reader sub-system 840, each serially connected to a bus add-on card 825. The bus add-on card 825 includes a device interface 826a for the bar code reader subsystem, and a device interface 826b for the RFID reader subsystem, each of which is connected to a device communications, control and power unit 860. The multiple technology data reader 800 also includes a trigger unit 870, which sends and receives control signals and power, both to and from the device communications, control and power unit 860 on the bus add-on card 825. The bus add-on card 825 is connected to a host computer 830 via a computer bus 850. The computer bus 850 may be any one of a variety of computer buses, including parallel or serial buses.

In the embodiment shown in FIG. 8, the reader device interfaces 826a has a controls input line 810a, which enables the host computer 830 to send control commands to the reader device interface 826a. In addition, the reader device interface 826a has a data output line 812, which allows the reader device interface 826a to send data to the host computer 830. Furthermore, data can be sent in either direction between the reader device interface 826a and the barcode reader subsystem 820 via a serial communication line 805a.

In a similar manner, reader device interface 826b has a controls line 810b, which enables the host computer 830 to send control commands to the reader device interface 826b. In addition, the reader device interface 826b has a data line 812b, which allows the reader device interface 826b to send data to the host computer 830. Data can be sent in either direction between the reader device interface 126b and the RFID reader subsystem 840 via the serial communication line 805b.

Figure 9:
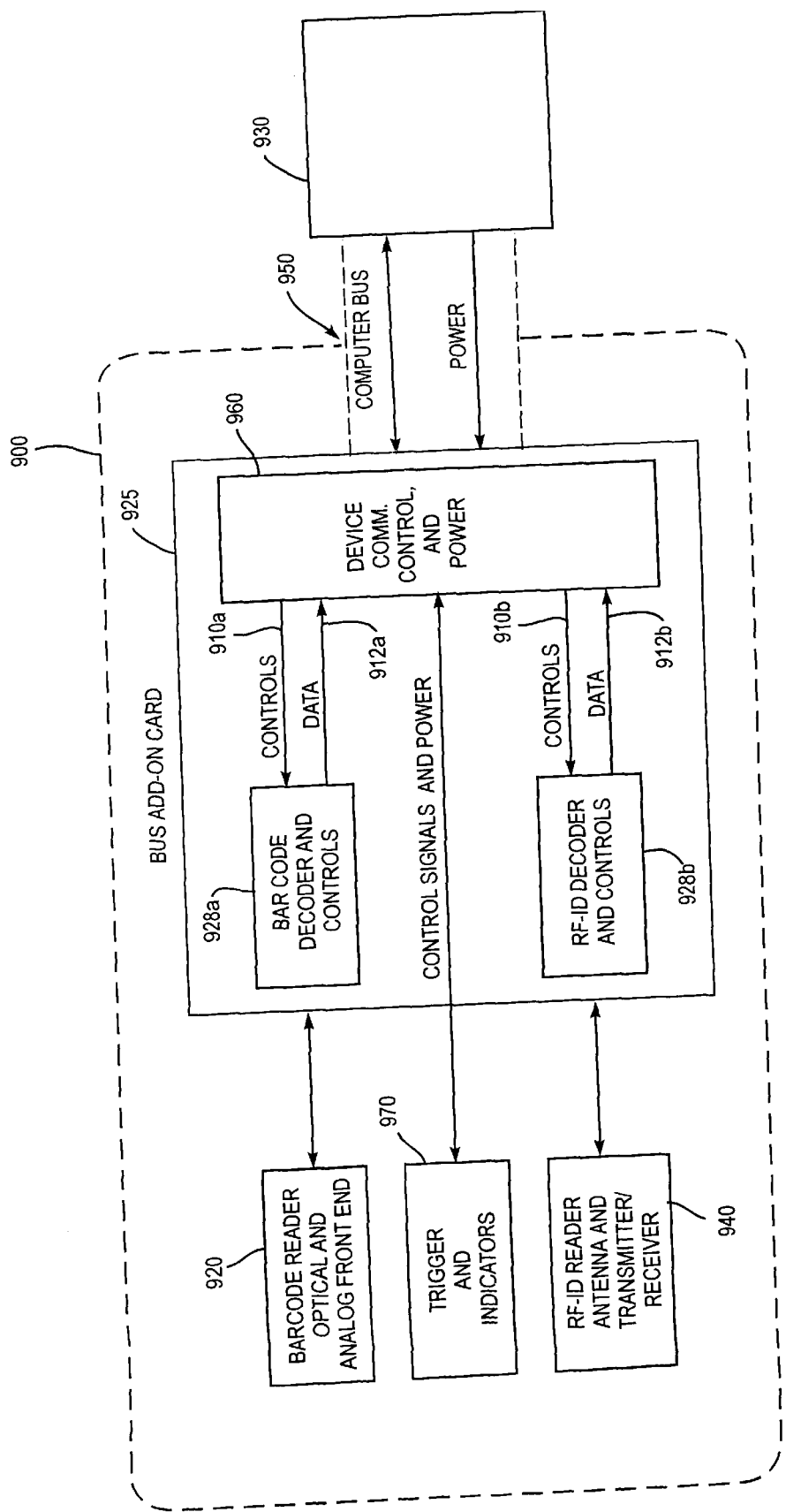

In a fifth embodiment, as shown in FIG. 9, the multiple technology data reader 900 includes the optical and analog front end components of a bar code reader 920, and the antenna and transmitter/receiver components of an RFID reader 940, which are connected to a device bus add-on card 925. The bus add-on card 925 includes a decoder and control unit 928a for the bar code reader, and another decoder and control unit 928b for the RFID reader. The decoder and control units 928a and 928b are each connected to a device communications, control and power unit 960. The multiple technology data reader 900 also includes a trigger unit 970, which sends and receives control signals and power, both to and from the device communications, control and power unit 960 on the bus add-on card 925. The bus add-on card 925 is connected to a host computer 930 via a computer bus 950. The computer bus 950 may be any one of a variety of computer buses, including parallel or serial buses.

In the embodiment shown in FIG. 9, the bar code decoder and control unit 928a has the same input and output lines as the reader device interface 826a described in FIG. 8. Likewise, the RFID decoder and control unit 228b has the same input and output lines as the reader device interface 826b described in FIG. 8.

Figure 10:
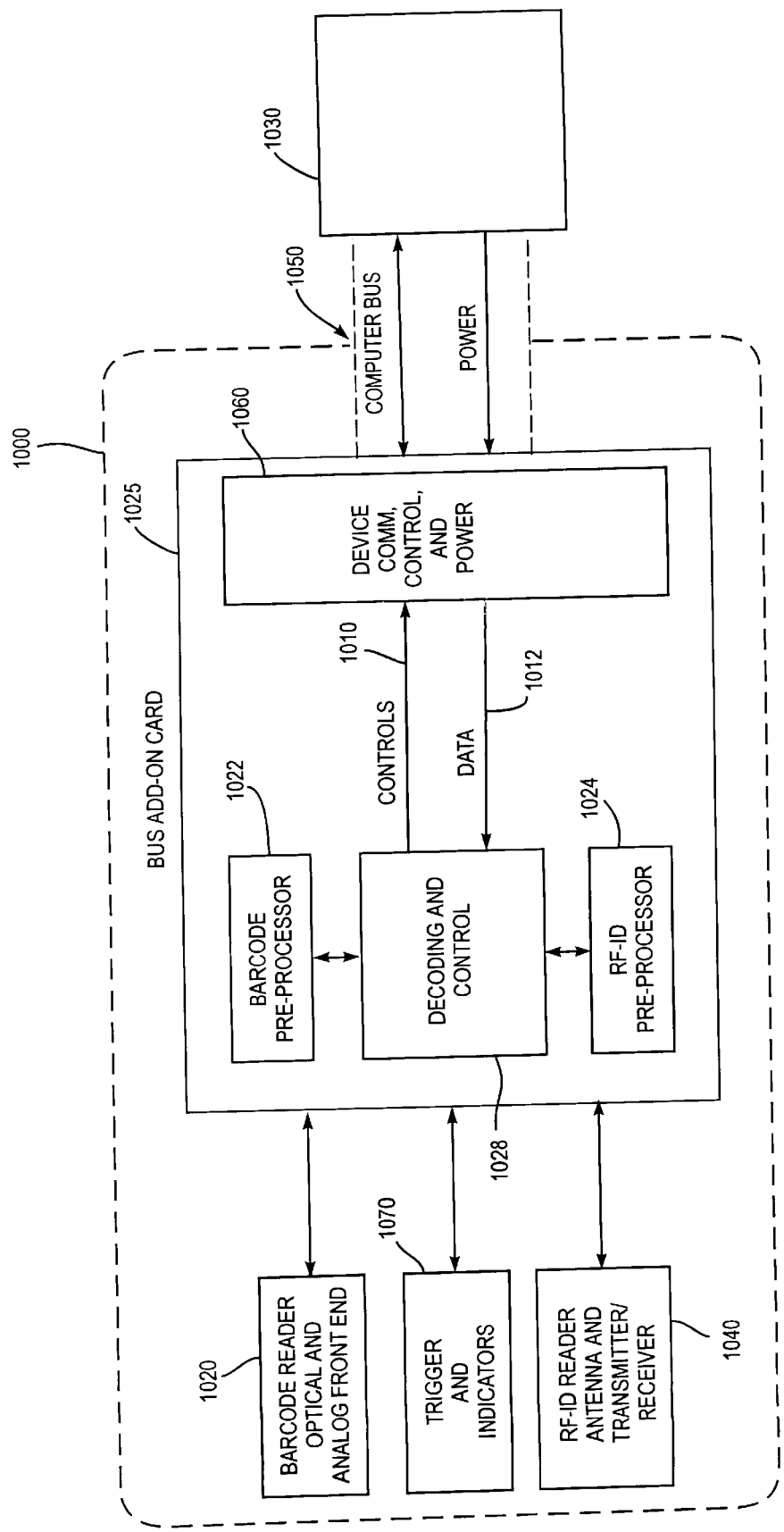

In a sixth embodiment, as shown in FIG. 10, the multiple technology data reader 1000 includes the optical and analog front end components of a bar code reader 1020, and the antenna and transmitter/receiver of an RFID reader 1040, which are connected to a bus add-on card 925. The bus add-on card 925 includes a bar code pre-processor 1022 and an RFID pre-processor 1024, both of which are connected to a common decoding and control unit 1028. The decoding and control unit 1028 is connected to a device communications, control and power unit 1060. The multiple technology data reader 1000 also includes a trigger unit 1070, which sends and receives control signals and power, both to and from the device communications, control and power unit 1060 on the bus add-on card 925. The bus add-on card 925 is connected to a host computer 1030 via a computer bus 1050. The computer bus 1050 may be any one of a variety of computer buses, including parallel or serial buses.

In the embodiment shown in FIG. 10, the decoding and control unit 1028 has a controls input line 1010, which enables the host computer to send control commands to the decoding and control unit 1028. In addition the decoding and control unit 1028 has a data output line 1012, which enables data to be sent from the decoding and control unit 1028 to the host computer 1030.

In any of the embodiments depicted in FIGS. 5–7, the device communications, control and power unit 16 may be used to activate the bar code reader 12 and the RFID reader 14 independently, simultaneously or concurrently. In one embodiment, the device may be configured such that when a user pulls a trigger (not shown) on the outer body of the multiple technology data reader 10, one of the following actions is initiated: (1) the bar code reader 12 alone is activated; (2) the RFID reader 14 alone is activated; or (3) both the bar code reader 12 and the RFID reader 14 are activated.

Alternatively, when a user pulls the trigger located on the outer body of the multiple technology data reader 10, the bar code reader 12 is briefly activated to test for the presence of a bar code symbol. The presence of a bar code symbol may be indicated by the satisfaction of certain pre-set, user-defined criteria from among the following possible conditions: (a) presence of certain levels of reflected light (i.e. from laser, LED or ambient sources); or (b) presence of certain light modulation in response to printed symbols. If the test conditions are satisfied, then the bar code reader 12 remains activated until the trigger is released or a bar code is detected. Alternatively, if the test conditions are not satisfied, then the RFID reader 14 is activated for a pre-configured test or read operation.

In yet another alternative embodiment, the device may be configured such that when a user pulls the trigger located on the outer body of the multiple technology data reader 10, the RFID reader 14 is briefly activated to test for the presence of an RFID tag based on the following set of pre-defined, user specified criteria: (a) return signals are detected that appear to be from decodable radio tags; or (b) packets of data are received which match certain pre-selected protocols. If the test conditions are satisfied, then the RFID reader 14 remains activated until the trigger is released or an RFID tag is detected. Alternatively, if the test conditions are not satisfied, then the bar code reader 12 is activated for a pre-configured test or read operation.

In any of the embodiments depicted in FIGS. 5–7, the user may specify which type of RFID tags should be read, and which should be ignored. For example, it is well known by those in the art that read/write tags can send an identification code, via a response signal, with multiple fields. The user may specify that the RFID reader 14 remain activated only if certain fields of the identification code sent by the RFID tag match user-defined criteria.

In addition, the user can also specify that the RFID reader 14 remain activated only if it appears that there is a single RFID tag in the read area. For instance, if there are multiple RFID tags in the read area, each RFID tag will send a response signal back to the RFID reader 14. Generally, when this occurs there will be a collision between the multiple response signals. In this case, the user may specify that the RFID reader 14 be deactivated if such a collision is detected.

In the case where multiple RFID tags are detected by the RFID reader 14, there may be an ambiguity as to which RFID tag is being read. To solve this problem, both an RFID tag and a bar code label may be placed on items to be identified. Then to avoid reading the wrong RFID tag, or having to physically separate the RFID tags, bar code reader operation may be automatically invoked instead when two or more RFID tags are detected. By activating the bar code reader 12 automatically, the user is able to obtain more precise and accurate information.

One advantage of this method of combining two automatic identification technologies into a single device is that the user is assured that a more accurate and reliable method of data acquisition is being employed for the specific task being performed.

While embodiments and applications of the present invention have been shown and described, it will be apparent to one skilled in the art that other modifications, alternatives and variations are possible without departing from the inventive concepts set forth herein. Therefore, the invention is intended to embrace all such modifications, alternatives and variations that fall within the scope and spirit of the appended claims.

What is claimed is:

1. A multiple technology data reader comprising:
    an optical data reader comprising
        a housing;
        a photosensitive detector within said housing;
        an optical collector for directing light on to said photosensitive detector; and
        processing circuitry connected to an output of said photosensitive detector;
    a radio frequency identification (RFID) reader for detecting a plurality of data;
    a communications unit connected to said optical data reader and said RFID reader; and
    a computer bus connected to said communications unit, said communications unit conveying over said computer bus data simultaneously or concurrently collected by said optical data reader and said RFID reader without requiring a user to select between said optical data reader and said RFID reader.

2. The data reader according to claim 1, wherein said optical collector, said processing circuitry, said RFID reader, said communication unit, and said computer bus are all within said housing.

3. The data reader according to claim 2 further comprising an internal hub having a first port and a second port, said first port connected to said optical data reader and said second port connected to said RFID reader, whereby said optical data reader and said RFID reader are logically addressable over said computer bus.

4. The data reader according to claim 3, wherein said computer bus supplies power from a host computer to the multiple technology data reader and establishes a two-way communication link between (i) said host computer and (ii) said optical data reader and said RFID reader.

5. The data reader according to claim 4 wherein said computer bus conveys data collected by said optical data reader and by said RFID reader to the host computer.

6. The data reader according to claim 5 wherein said computer bus comprises a universal serial bus and is connected to the host computer, said universal serial bus providing independent, logical addressing by the host computer of said optical data reader and said RFID reader.

7. The data reader according to claim 2 wherein said RFID reader is a low frequency radio frequency identification reader.

8. The data reader according to claim 2 wherein said RFID reader comprises a low frequency radio frequency identification reader and a high frequency radio frequency identification reader.

9. The data reader according to claim 1 further comprising a wireless communication link for establishing two-way communication between said computer bus and a host computer.

10. The data reader according to claim 9 wherein said computer bus comprises a universal serial bus.

11. A multiple technology data reader comprising:
a housing;
an optical data reader located within said housing;
a multi-bit radio frequency identification (RFID) reader located within said housing;
a communications unit connected to said optical data reader and said RFID reader;
a computer bus connected to said communications unit; and
means for simultaneously, concurrently or independently operating both said optical data reader and said RFID reader and automatically selecting data to be convey over said computer bus from either said optical data reader or said RFID reader without user intervention.

12. The data reader according to claim 11, wherein said means for operating both said optical data reader and said RFID reader and selecting data to be convey over said computer bus comprises means for temporarily activating said optical data reader to test for a presence of a bar code symbol and, if the test is satisfied, then keeping said optical data reader activated.

13. The data reader according to claim 12, wherein said RFID reader is automatically activated if the test for the presence of a bar code symbol is not satisfied.

14. The data reader according to claim 13, wherein said communication unit, said computer bus, and said means for operating both said optical data reader and said RFID reader and selecting data to be convey over said computer bus are all located within said housing.

15. The data reader according to claim 11, wherein said means for operating both said optical data reader and said RFID reader and selecting data to be convey over said computer bus comprises means for temporarily activating said RFID reader to test for a presence of a RFID tag and, if the test is satisfied, then keeping said RFID reader activated.

16. The data reader according to claim 15, wherein said optical data reader is automatically activated if the test for the presence of an RFID tag is not satisfied.

17. The data reader according to claim 16, wherein said communication unit, said computer bus, and said means for operating both said optical data reader and said RFID reader and selecting data to be convey over said computer bus are all located within said housing.

18. A multiple technology data reader comprising:
a housing;
an optical data reader located within said housing;
a radio frequency identification (RFID) reader located within said housing;
a communications unit connected to said optical data reader and said RFID reader;
a computer bus connected to said communications unit;
means for automatically operating both said optical data reader and said RFID reader in response to no more than a single user action; and
means for deactivating said RFID reader if a collision is detected between response signals from multiple RFID tags and wherein said optical reader is activated in response to detection of two or more RFID tags by said RFID reader in order to distinguish between the two or more detected RFID tags.

19. The data reader according to claim 18, wherein said communication unit, said computer bus, said means for automatically operating both said optical data reader and said RFID reader, and said means for deactivating said RFID reader are all located within said housing.

20. A data reader according to claim 19, wherein said RFID reader is activated only if a radio frequency identification code received from an RFID tag matches a user-defined criterion.

21. A data reader according to claim 19, wherein said single user action comprises pulling of a trigger of said data reader by a operator of said data reader.

22. A data reader according to claim 21, wherein said means for automatically operating both said optical data reader and said RFID reader comprises means for temporarily activating said optical data reader to test for the presence of a bar code symbol and, if the test is satisfied, then keeping said optical data reader activated and said RFID reader is automatically activated if the test for the presence of a bar code symbol is not satisfied.

23. A method for reading data, comprising the steps of:
providing a multi-technology data reader with an optical data reader and a multi-bit radio frequency identification (RFID) reader within a single housing;
activating said optical data reader and said RFID reader simultaneously, concurrently or independently;
reading an optical code with said optical data reader to obtain data therefrom;
reading an RFID tag with said RFID reader to obtain data therefrom;
outputting the data from said optical data reader and the data from said RFID reader; and
selecting without user intervention the data from either said optical data reader or said RFID reader for further processing.

24. The method according to claim 23, further comprising the step of conveying the data from said optical data reader and said RFID reader over a universal serial bus to a host computer.

25. The method according to claim 24, further comprising the step of transmitting instructions from the host computer to said optical data reader and said RFID reader over the universal serial bus, said universal serial bus providing logical addressing of said optical data reader and said RFID reader.

26. The method according to claim 25, further comprising the step of supplying power to said optical data reader and said RFID reader from the host computer via said universal serial bus.

27. The method of claim 23, wherein said step of activating both said optical data reader and said RFID reader comprises the step of temporarily activating said optical data reader to test for presence of a bar code symbol and activating said RFID reader if the test is not satisfied.

28. The method of claim 23, wherein said step of activating both said optical data reader and said RFID reader comprises the step of temporarily activating said RFID reader to test for presence of an RFID tag and activating said optical data reader if the test is not satisfied.

29. The method of claim 23, wherein said RFID reader is activated only if a radio frequency identification code sent by a RFID tag matches a user-defined criterion.

30. The method of claim 23, further comprising the step of deactivating said RFID reader if a collision is detected between response signals from multiple RFID tags.

31. The method of claim 30, further comprising the step of activating said optical data reader if two or more RFID tags are detected by said RFID reader in order to distinguish between the two or more detected RFID tags.

32. The method of claim 23, further comprising the step of conveying the data from said optical data reader and said RFID reader to a host computer via a wireless communication link.

33. A multiple technology data reader comprising:
   an optical data reader, said optical data reader comprising a bar code decoder;
   an RFID reader, said RFID reader comprising an RFID decoder for decoding multiple bits of information;
   a device microcontroller serially connected to said optical data reader and said RFID reader, said device microcontroller comprising a communications control interface, an optical data reader interface connected to said communications control interface, and an RFID reader interface connected to said communications control interface;
   a bus add-on card for integrating said communication control interface, said optical data reader interface, and said RFID reader interface into a single unit that can be detached and replaced during upgrading; and
   a serial computer bus connected to said communications control interface and to a host computer, said serial computer bus providing logical addressing of said optical data detector interface and said RFID interface by the host computer.

34. A multiple technology data reader according to claim 33, wherein said serial computer bus allows the host computer to supply power to the multiple technology data reader.

35. A multiple technology data reader according to claim 33, further comprising a trigger unit connected to said communications control interface.

36. A multiple technology data reader according to claim 33, wherein said computer bus comprises a universal serial bus (USB).

37. A multiple technology data reader according to claim 33, wherein said optical data detector comprises a bar code reader.

38. A multiple technology data reader comprising:
   a housing;
   an optical data reader located within said housing;
   a radio frequency identification (RFID) reader located within said housing;
   a communications unit connected to said optical data reader and said RFID reader;
   a computer bus connected to said communications unit; and
   means for automatically operating both said optical data reader and said RFID reader in response to no more than a single user action, wherein said means for automatically operating both said optical data reader and said RFID reader comprises means for temporarily activating said RFID reader to test for the presence of a RFID tag and, if the test is satisfied, then keeping said RFID reader activated and, if the test is not satisfied, then automatically activating said optical reader.

39. The data reader according to claim 38, wherein said communication unit, said computer bus, and said means for automatically operating both said optical data reader and said RFID reader are all located within said housing.

40. A data reader according to claim 39, wherein said single user action comprises pulling of a trigger of said data reader by a operator of said data reader.

41. A data reader according to claim 39, wherein said RFID reader is activated only if a radio frequency identification code received from an RFID tag matches a user-defined criterion.

42. A data reader according to claim 41, wherein said RFID reader is deactivated if a collision is detected between response to signals from multiple RFID tags.

43. A data reader according to claim 42, wherein said optical data reader is activated in response to detection of two or more RFID tags by said RFID reader in order to distinguish between the two or more detected RFID tags.

* * * * *